(12) United States Patent
Eicks

(10) Patent No.: US 7,637,230 B1
(45) Date of Patent: Dec. 29, 2009

(54) HONDA DEVICE

(76) Inventor: Jack R. Eicks, P.O. Box 554, Parowan, UT (US) 84761

( * ) Notice: Subject to any disclaimer, the term of this patent is extended or adjusted under 35 U.S.C. 154(b) by 232 days.

(21) Appl. No.: 11/743,385

(22) Filed: May 2, 2007

(51) Int. Cl.
*A01K 15/04* (2006.01)
*A01K 37/00* (2006.01)
*A01K 27/00* (2006.01)
*A41F 1/00* (2006.01)
*A44C 11/02* (2006.01)
*A44B 18/00* (2006.01)
*F16G 11/05* (2006.01)
*F16G 11/00* (2006.01)

(52) U.S. Cl. .................. 119/805; 119/808; 119/712; 119/792; 119/795; 24/572.1; 24/573.11; 24/583.1; 403/275; 403/311

(58) Field of Classification Search ......... 119/801–805, 119/808, 856, 712, 792, 795; 24/572.1, 573.11, 24/578.12, 583.1, 594.1, 594.11, 132 R, 652, 24/627; 403/239, 292–294, 297, 298, 275, 403/308, 311

See application file for complete search history.

(56) References Cited

U.S. PATENT DOCUMENTS

| | | | | |
|---|---|---|---|---|
| 1,703,579 A | * | 2/1929 | Gaffner | .............. 403/182 |
| 1,774,347 A | * | 8/1930 | Bainton | .............. 24/674 |
| 2,530,031 A | | 11/1950 | Rudolph | |
| 2,563,533 A | * | 8/1951 | Knox | .............. 119/805 |
| 3,165,091 A | * | 1/1965 | Welton | .............. 119/805 |
| 3,716,031 A | | 2/1973 | Rowbury | |
| 3,793,685 A | * | 2/1974 | Knecht | .............. 24/651 |
| 4,709,454 A | * | 12/1987 | Barnes | .............. 24/573.11 |
| 4,928,634 A | | 5/1990 | Voigt | |
| 5,138,855 A | * | 8/1992 | Faris | .............. 70/457 |
| D337,153 S | | 7/1993 | King | |
| 5,782,107 A | * | 7/1998 | Glanz | .............. 63/3 |
| 5,806,469 A | | 9/1998 | Cooper-Ratliff et al. | |
| 6,044,801 A | | 4/2000 | Chavez | |
| 6,146,049 A | * | 11/2000 | Faris | .............. 403/326 |
| 6,382,138 B1 | | 5/2002 | Campbell | |
| 6,814,523 B1 | * | 11/2004 | Nilsson | .............. 403/305 |

* cited by examiner

*Primary Examiner*—Peter M Poon
*Assistant Examiner*—Kristen C Hayes

(57) ABSTRACT

A honda device for separating a honda to allow easy retrieval of a rope includes a rope having a honda positioned adjacent a lariat end of the rope. The honda has a break therein to define a first end and a second end of the honda. A female coupler is coupled to the first end of the honda. The female coupler has a receiving bore extending into a free end of the female coupler. A male coupler is coupled to the second end of the honda. The male coupler includes an insertion end being inserted into the receiving bore of the female coupler to releasably secure the male coupler to the female coupler. The male coupler is selectively removed from the female coupler to break the honda.

6 Claims, 4 Drawing Sheets

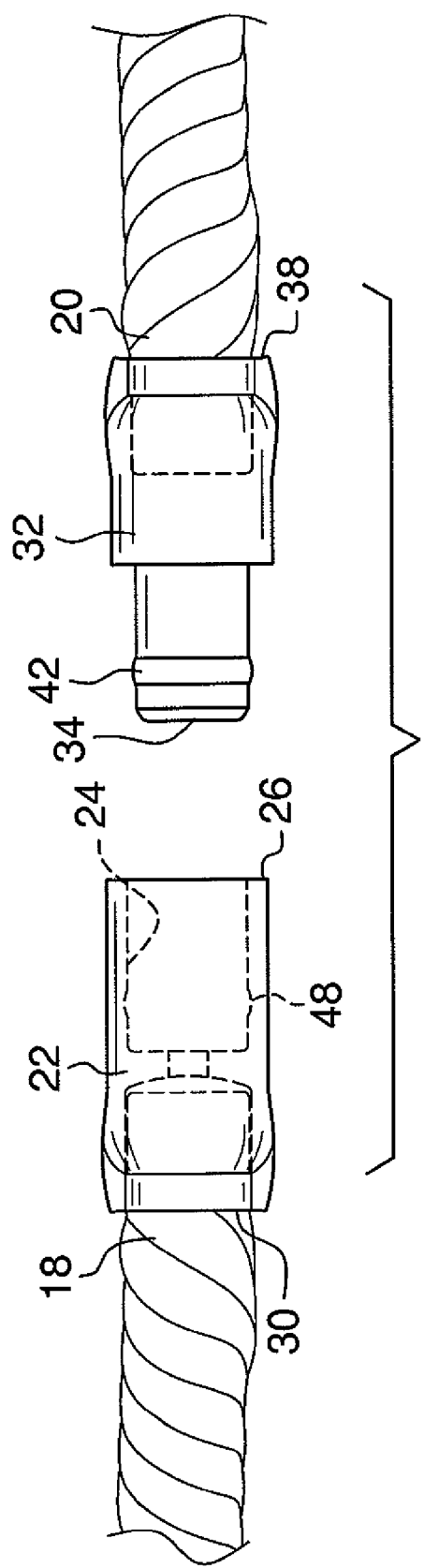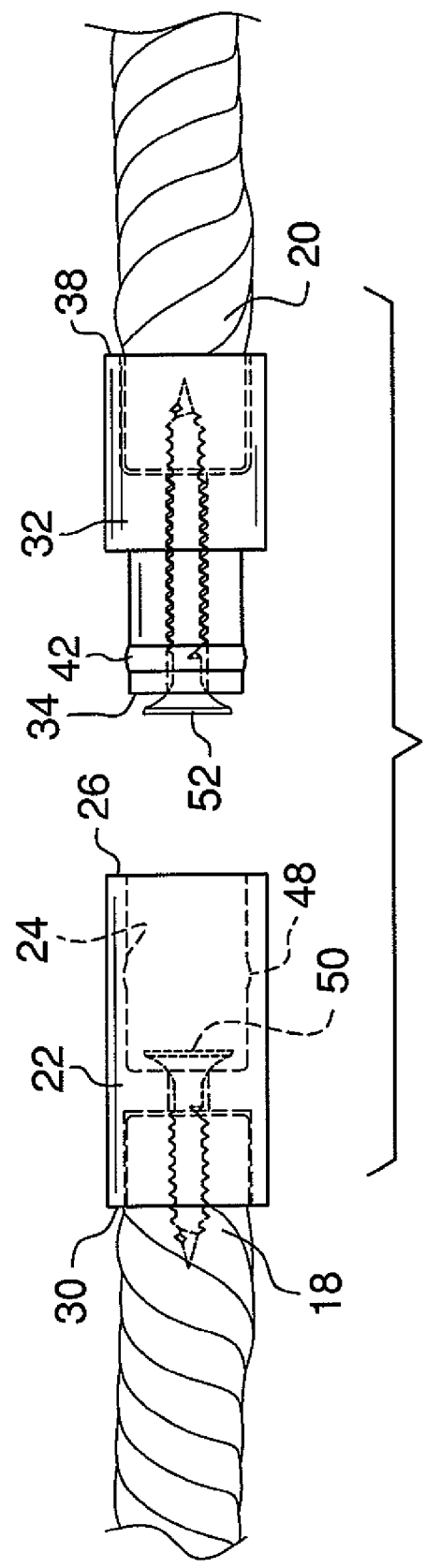

HONDA DEVICE

BACKGROUND OF THE INVENTION

1. Field of the Invention

The present invention relates to quick release lariats and more particularly pertains to a new quick release lariat for separating a honda to allow easy retrieval of a rope.

2. Description of the Prior Art

The use of quick release lariats is known in the prior art. While these devices fulfill their respective, particular objectives and requirements, the need remains for a device that has certain improved features that positions a resistance ring mounted to a male coupler into a seating channel of a female coupler to resist inadvertent separation of the male coupler from the female coupler. Additionally, the device should include an adhesive to adhere a first end of the honda to the female coupler and a second end of the honda to the male coupler.

SUMMARY OF THE INVENTION

The present invention meets the needs presented above by generally comprising a rope having a honda positioned adjacent a lariat end of the rope. The honda has a break therein to define a first end and a second end of the honda. A female coupler is coupled to the first end of the honda. The female coupler has a receiving bore extending into a free end of the female coupler. A male coupler is coupled to the second end of the honda. The male coupler includes an insertion end being inserted into the receiving bore of the female coupler to releasably secure the male coupler to the female coupler. The male coupler is selectively removed from the female coupler to break the honda.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an enlarged front view of an embodiment of the present invention.

FIG. 6 is an enlarged front view of an embodiment of the present invention.

DESCRIPTION OF THE PREFERRED EMBODIMENT

Figure 1:
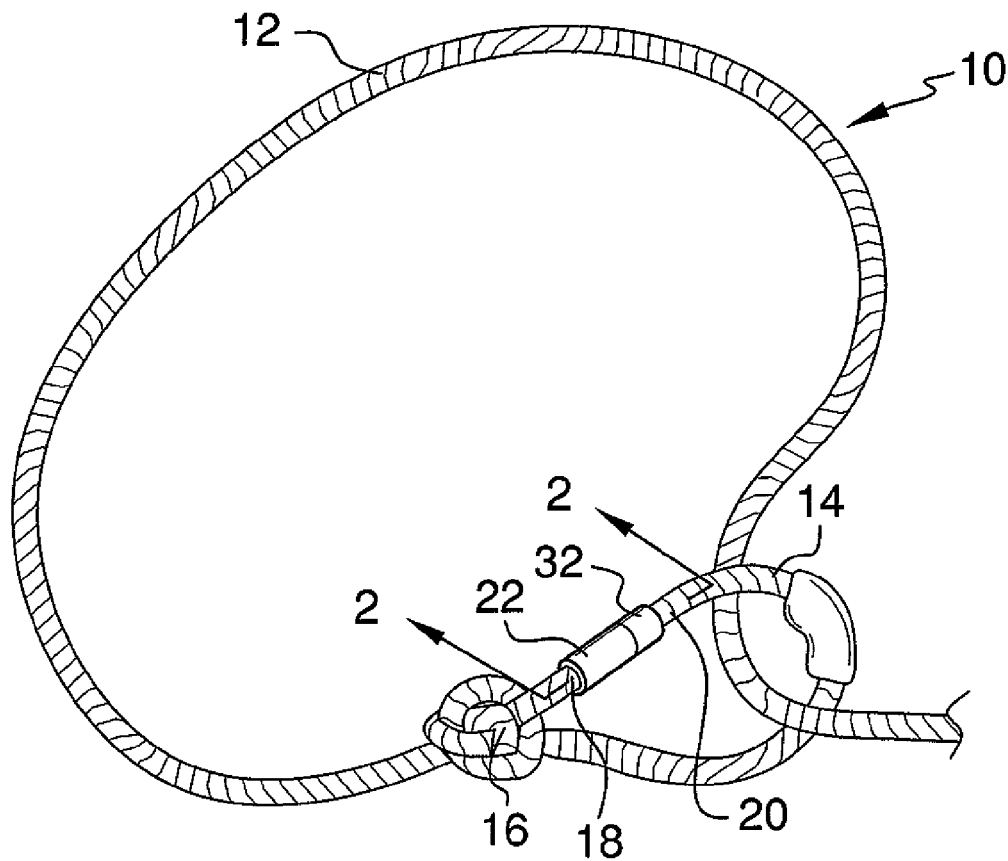
FIG. 1 is a perspective view of a honda device according to the present invention shown in use.
Figure 2:
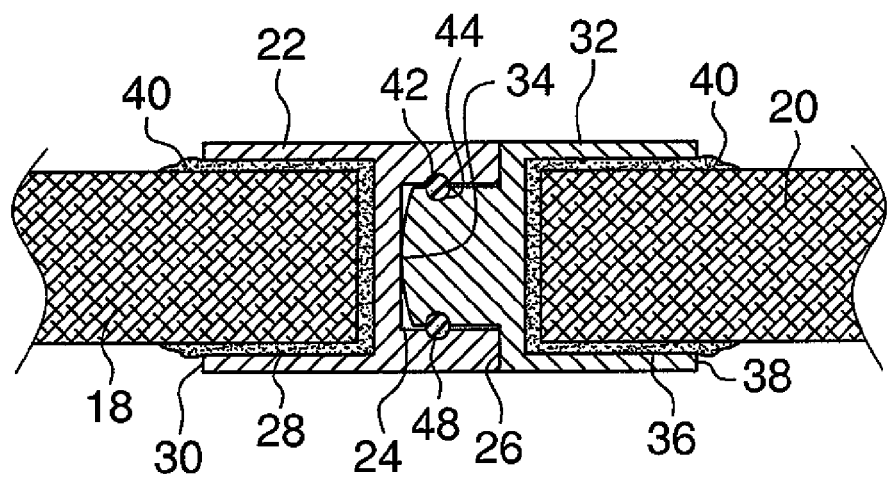
FIG. 2 is a cross-sectional view of the present invention taken along line 2-2 of FIG. 1.
Figure 3:
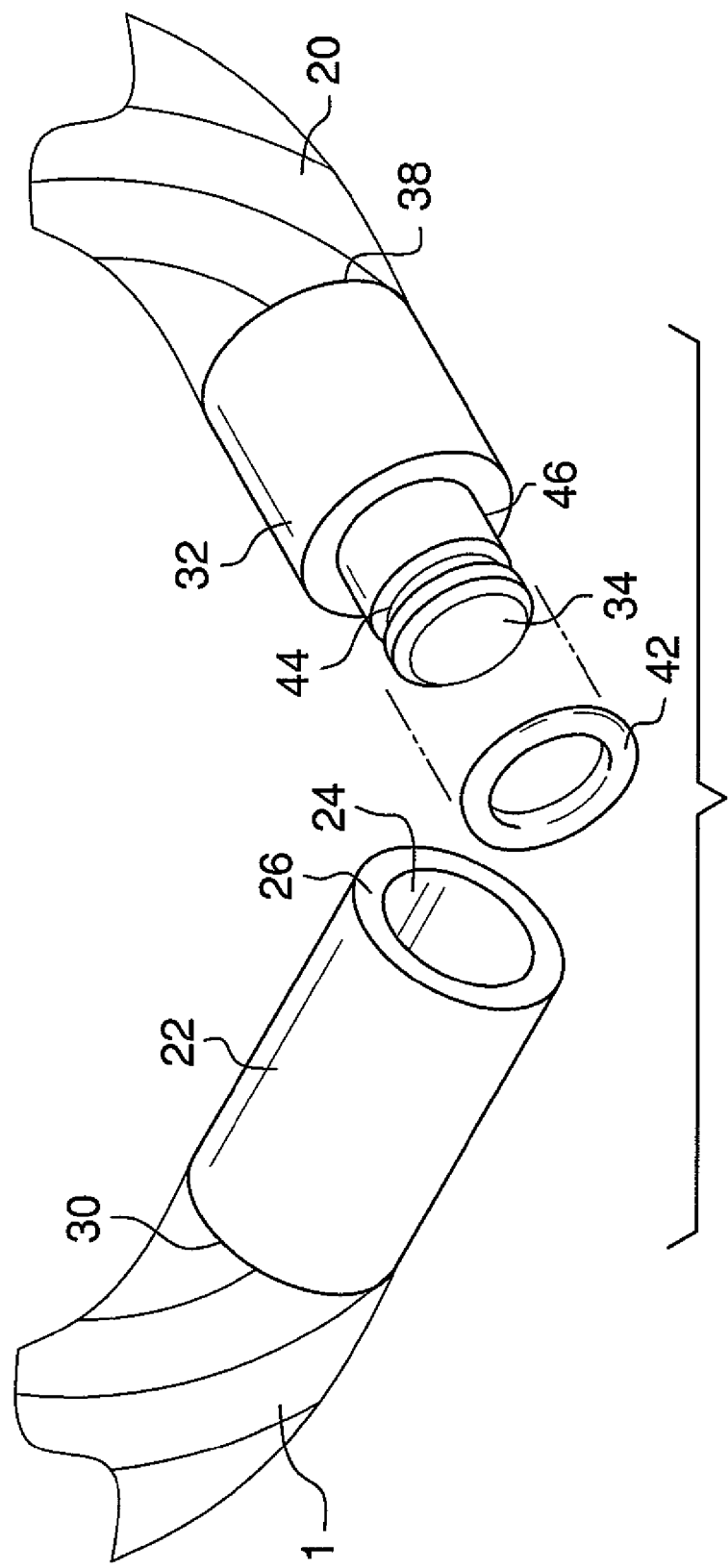
FIG. 3 is an exploded perspective view of the present invention.
Figure 4:
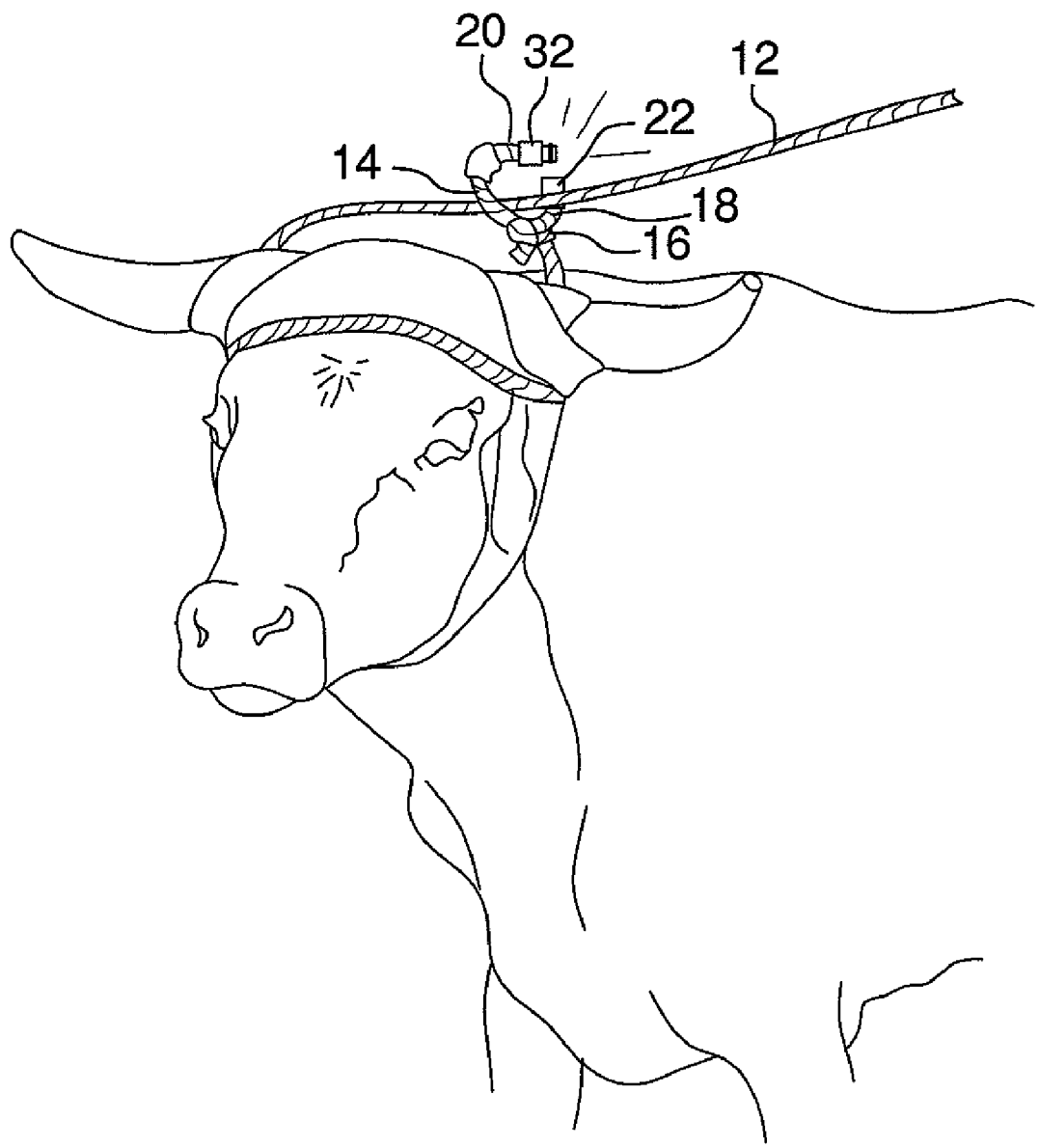
FIG. 4 is a front view of the present invention showing the female coupler and the male coupler being separated to allow retrieval of the rope.

With reference now to the drawings, and in particular to FIGS. 1 through 6 thereof, a new quick release lariat embodying the principles and concepts of the present invention and generally designated by the reference numeral 10 will be described.

As best illustrated in FIGS. 1 through 6, the honda device 10 generally comprises a rope 12 having a honda 14 positioned adjacent a lariat end 16 of the rope 12. The honda 14 has a break therein to define a first end 18 and a second end 20 of the honda 14. A female coupler 22 is coupled to the first end 18 of the honda 14 and has a receiving bore 24 that extends into a free end 26 of the female coupler 22. The female coupler 22 has an anchoring bore 28 that extends into an anchored end 30 of the female coupler 22. The anchoring bore 28 receives the first end 18 of the honda 14.

A male coupler 32 is coupled to the second end 20 of the honda 14. The male coupler 32 includes an insertion end 34 insertable into the receiving bore 24 of the female coupler 22 to releasably secure the male coupler 32 to the female coupler 22. The male coupler 32 has a mounting bore 36 that extends into the male coupler 32 through a mounted end 38 of the male coupler 32. The mounting bore 36 receives the second end 20 of the honda 14. An adhesive 40 is inserted into the anchoring bore 28 and the mounting bore 36. The adhesive 40 adheres the first end 18 of the honda 14 to the female coupler 22. The adhesive 40 adheres the second end 20 of the honda 14 to the male coupler 32.

A resistance ring 42 is positioned around the male coupler 32 and positioned adjacent the insertion end 34 of the male coupler 32. The resistance ring 42 is positioned between the male coupler 32 and the female coupler 22 to provide resistance to separation of the male coupler 32 from the female coupler 22 when the male coupler 32 is inserted into the female coupler 22. The resistance ring 42 is positioned in an anchoring channel 44 that extends into the male coupler 32 from a peripheral edge 46 of the male coupler 32 adjacent the insertion end 34.

The female coupler 22 has a seating channel 48 that extends into the female coupler 22 from the receiving bore 24. The seating channel 48 is aligned with the anchoring channel 44 to permit insertion of the resistance ring 42 into the seating channel 48 when the male coupler 32 is inserted into the female coupler 22. The resistance ring 42 resists removal from the seating channel 48 to inhibit separation of the male coupler 32 from the female coupler 22. The resistance ring 42 is pulled from the seating channel 48 to permit separation of the male coupler 32 from the female coupler 22 when a predetermined amount of force is applied along a longitudinal axis of the male coupler 32 and the female coupler 22.

In an embodiment, as shown in FIG. 5, the anchored end is crimpable to permit the anchored end 30 to be crimped around the first end 18 of the honda 14 to secure the female coupler 22 to the first end 18. The mounted end 38 is crimpable to permit the mounted end 38 to be crimped around the second end 20 of the honda 14 to secure the male coupler 32 to the second end 20. In an embodiment, as shown in FIG. 6, a first fastener 50 is threadably inserted into the female coupler 22 and the first end 18 of the honda 14 through the receiving bore 24 to secure the female coupler 22 to the first end 18. A second fastener 52 is threadably inserted into the male coupler 32 and the second end 20 of the honda 14 through the insertion end 34 to secure the male coupler 32 to the second end 20.

In use, the female coupler 22 is mounted to the first end 18 of the honda 14 and the male coupler 32 is mounted to the second end 20 of the honda 14. The insertion end 34 of the male coupler 32 is inserted into the receiving bore 24 of the female coupler 22 so that the resistance ring 42 is positioned in the seating channel 48 to close the break in the honda 14. The lariat formed by the passage of the rope 12 through the honda 14 can then be used to practice roping of an object. To break the honda 14 and retrieve the rope 12 without having to approach the object the rope is pulled to apply force along the longitudinal axis of the female coupler 22 and the male coupler 32 to pull the resistance ring 42 from the seating channel 48. As the female coupler 22 is separated from the male coupler 32 the honda 14 breaks between the first end 18 and the second end 20 to allow the rope 12 to pass through the honda 14 and be pulled back to a person using the rope 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A honda device for a lariat, said device comprising:
   a rope having a honda positioned adjacent a lariat end of said rope, said honda having a break therein to define a first end and a second end of said honda;
   a female coupler being coupled to said first end of said honda, said female coupler having a receiving bore extending into a free end of said female coupler, said female coupler having an anchoring bore extending into an anchored end of said female coupler, said anchoring bore receiving said first end of said honda
   a first fastener being positioned within said receiving bore and extending through a wall dividing said anchoring bore and said receiving bore, said first fastener extending into said first end of said honda to couple said first end to said female coupler; and
   a male coupler being coupled to said second end of said honda, said male coupler including an insertion end being inserted into said receiving bore of said female coupler to releasably secure said male coupler to said female coupler, said male coupler being selectively removed from said female coupler to break said honda, said male coupler having a mounting bore extending therein, said second end mounted into said mounting bore;
   a second fastener extending into an insertion end of said male coupler and into said second end of said honda to couple said honda to male coupler, each of said first and second fasteners being threaded fasteners.

2. The device according to claim 1, wherein said anchored end is crimpable to permit said anchored end to be crimped around said first end of said honda to secure said female coupler to said first end.

3. The device according to claim 1, wherein said mounted end is crimpable to permit said mounted end to be crimped around said second end of said honda to secure said male coupler to said second end.

4. The device according to claim 1, further comprising a resistance ring being positioned around said male coupler and positioned adjacent said insertion end of said male coupler, said resistance ring being positioned between said male coupler and said female coupler to provide resistance to separation of said male coupler from said female coupler when said male coupler is inserted into said female coupler.

5. The device according to claim 4, wherein said resistance ring is positioned in an anchoring channel extending into said male coupler from a peripheral edge of said male coupler adjacent said insertion end.

6. The device according to claim 5, wherein said female coupler has a seating channel extending into said female coupler from said receiving bore, said seating channel being aligned with said anchoring channel to permit insertion of said resistance ring into said seating channel when said male coupler is inserted into said female coupler, said resistance ring resisting removal from said seating channel to inhibit separation of said male coupler from said female coupler, said resistance ring being pulled from said seating channel to permit separation of said male coupler from said female coupler when a predetermined amount of force is applied along a longitudinal axis of said male coupler and said female coupler.

* * * * *